Patented Sept. 28, 1954

2,690,400

UNITED STATES PATENT OFFICE 2,690,400

BLACK CUPREOUS POWDER AND METHOD OF MAKING THE SAME

Dean S. Hubbell, Pittsburgh, Pa., assignor to H. H. Robertson Company, Pittsburgh, Pa., a corporation of Pennsylvania No Drawing. Application October 11, 1951, Serial No. 250,953

7 Claims. (Cl. 106—290)

This invention relates to a black cupreous powder.

One object of the invention is to produce a novel black cupreous powder which finds particular use as a black pigment for use in antifouling paints and coatings.

A further object of the invention is to produce a novel plant fungicide comprising a black cupreous powder whose physical characteristics and properties are such as to enable it to be more readily suspended in water for use in spray tanks with minimum settling, and which may be readily sprayed on plants and other vegetation to which it is desired to apply the fungicide.

A further object of the invention is to provide a novel and superior method for the production of the present cupreous powder.

With these objects in view and such others as may hereinafter appear, the invention consists in the black cupreous powder and in the method of making the same hereinafter described and particularly defined in the claims at the end of this specification.

A need exists for a satisfactory effective black antifouling paint for painting submarines and painting the boot tops of ships and for other uses. Attempts which have been made to produce black antifouling paints by the addition to the usual antifouling paints of conventional black pigments, such as carbon black, have failed because of the reduction is the antifouling effectiveness of the paint and also to some extent because the life of the paint has been substantially diminished thereby.

The present black cupreous powder is, in accordance with the present invention, produced from cement copper or precipitated copper and is based primarily upon the reaction of less than stoichiometric amounts of finely divided elemental sulphur with at least stoichiometric amounts of the copper content of the cement copper, preferably while each is suspended in slightly acidified hot water. Thereafter the unreacted copper is separated, either in whole or part, and the resulting cuprous sulfide is dried and ground to produce the black cupreous powder.

Cement copper or copper precipitate as produced at the refineries or mines comprises a brownish red sludge wherein the copper is present in the form of a peculiar crystalline form of copper particle dendritic in nature and capable of being easily crushed when subjected to impact or crushing as by passing through one of several types of hammermills, jet pulverizers, and ball mills. In accordance with the preferred method, the cement copper or copper precipitate, preferably in the condition in which it is received from the refineries, and containing relatively large amounts of water, is first pulped into a suspension, and this may be accomplished by mixing the cement copper or copper precipitate mud in any usual or preferred form of mixing apparatus with the addition of substantial proportions of water, and the pulped copper is then passed through a homogenizer of any usual or preferred design until a smooth suspension is obtained of the consistency of thick, hot chocolate. Similarly, sulphur in the form of either sulphur flour or the commercial product known as "Sulphuron" is made up into a smooth suspension in water following the above-described practice, that is by mixing with water in a mixing apparatus and then putting the suspension through a homogenizer until a smooth suspension is obtained free from lumps. The sulphur flour may have a small amount of a wetting agent added thereto, although if the product "Sulphuron" is used the wetting agent has been incorporated therein during its production.

After the two suspensions have been produced as described, they are intimately mixed, preferably by passage through any known type of homogenizer, and the mixture is then acidified with a small amount of acid, such for example as by 1 cc. of 60° sulphuric acid per 100 grams of cement copper in the mixture. Preferably, the acidified mixture is then heated to boiling with agitation for a period of from 20 to 30 minutes. At the end of this time the sulphur is spent, and the black cuprous sulfide settles rapidly. Both the heating and the agitation can be accomplished by passing steam into the tank. The progress of the precipitation is indicated by the color. As soon as the free sulphur is exhausted (as shown by any of several known quick tests) the cuprous sulfide can be allowed to settle out of suspension and the unreacted copper drawn off. This can be accomplished because the copper, although of greater specific gravity is smaller and can be kept in suspension while the cuprous sulfide settles out. A sharp separation is not required for some carry over of copper does not measurably effect the blackness of the pigment and very possibly improves its antifouling efficiency. As a matter of fact, the unreacted copper in the product may be desirable within the proportions that must be maintained to insure against the production of cupric sulfide.

The cuprous sulfide is free filtering, coming down rapidly to approximately 6% moisture.

Any filtering means available may be used to filter the cuprous sulfide from the simplest false-bottom box filter to a centrifuge. The product at this point is ready for passage through an impact mill in order to reduce the particle size of the cuprous sulfide to a point where the majority of the particles lie between 10 and 40 microns.

In practice, the cuprous sulfide containing the small amount of moisture (in practice less than 10%) and containing some metallic copper, is subjected to a grinding operation, preferably under the conditions set forth in my United States Patent No. 2,420,540.

Because of the peculiar crystalline form of copper particles contained in the cement copper or copper precipitate as produced at the refineries or mines and from which the cuprous sulfide is produced as above described, the latter is similarly shaped and capable of being easily crushed when subjected to the impact of crushing as by passing through one of the various types of hammermills.

As set forth in my U. S. patent above referred to, the process of producing the cuprous powder therein referred to involved preliminary drying of the cement copper prior to passage through the impact mill. In the present instance, the cuprous sulfide product produced as above described after filtering or other removal of the major portion of the moisture embodies a residual amount of water approximating from 5 to 10%, and in this condition is ready for passage through the impact or crushing and drying mill. The passage of the material through the impact or crushing mill results in a stable black cuprous powder embodying a small moisture content, usually from 0.2-0.4% and in which the particles are composed primarily of cuprous sulfide with some very finely divided unreacted copper dispersed throughout the mass. The particle size is preferably reduced to the point where most of the particles lie within the range of from 10 to 40 microns.

Because of the limited solubility of the cuprous sulfide in cold water in the neighborhood of 0.0005 gram per liter, it is critical that the cuprous powder of the present invention be ground to a sufficiently small size so that the ratio of surface to body is high thereby insuring a solution range sufficient to enable the powder to function efficiently as an antifouling coating for ships and other installations which are exposed to sea water.

During the passage of the dendritic cuprous sulfide containing substantial amounts of unreacted dendritic copper through the impact or other crushing mill, such for example, as through a Raymond Imp mill, the friable particles are broken apart, and the operation is continued until the particle is reduced to a few microns as above described. The formation of cuprous sulfide from the particles of copper precipitate is evidently not a surface reaction in which films of cuprous sulfide are formed on metallic copper particles. Instead the entire particle appears to be converted to cuprous sulfide. The copper which remains unconverted when a deficiency of sulphur is deliberately maintained is present in its original condition. Any new metallic surfaces produced by the crushing of the unconverted metallic copper particles are produced at a time when the copper particles are hot as a result of the impact, and these surfaces are swept by an atmosphere that is at least somewhat oxidizing in nature. As a result some cuprous oxide film is formed on the surface of the individual unconverted copper particles. This cuprous oxide film appears to completely surround and protect the metallic copper particles from further oxidation. In this respect, the cuprous oxide films on the copper particles assist in imparting stability against oxidation when the cupreous powder is exposed to the air as in storing. This air stability of copper particles in the powder is important in preventing the formation of cupric sulfide and cupric oxide and contributes to the maintenance of the cupreous powder in more perfect condition for antifouling purposes. While the proportions of cuprous sulfide with free metallic copper in the black cupreous powder of the present invention may vary substantially and still preserve the black color of the product, it has been found that by controlling the proportions of elemental sulphur to the copper in the reacting materials, the proportion of free metallic copper in the final product may be varied from a small copper content to a substantial copper content. In practice, it has been determined that when the deficiency of sulphur in the reacting materials drops to below 90% of the stoichiometric amount, the resulting cupreous powder starts to assume a mahogany color, and the depth of the mahogany color increases as the proportion of sulphur decreases below this value. For some purposes these mahogany-colored products find use, but it is preferred, however, to maintain the intense black color imparted to the product by proportions of cuprous sulfide above 90%.

While it is preferred to produce the cupreous powder in accordance with the method above described primarily because the various operations are easy to control, nevertheless, the invention contemplates the production of the present cuprous powder by other methods involving the reaction of small dendritic particles of copper with finely divided sulphur while maintaining the reactants in intimate contact producing finely divided cuprous sulfide having particles of a shape similar to the shape of the original copper particles and which accordingly are capable of being easily broken down to extremely small particle size. Preferably, the reaction is carried on under conditions that permit control of temperature, agitation and exclusion of air and permit close proportioning of the relative amounts of copper and sulphur. In practice, it is preferred to maintain the sulphur in an amount slightly but sufficiently below the stoichiometric amount required for producing cuprous sulfide, so that the resulting black cupreous powder comprises a major proportion of cuprous sulfide and a small proportion of metallic copper, and is substantially free from cupric sulfide.

The deficiency in sulphur insures that all the sulphur is converted to cuprous sulfide reducing to a minimum the liability of formation of any cupric sulfide. Any unreacted copper particles can, if desired, be separated from the cuprous sulfide as above described, although it is preferred to permit the unreacted copper particles to remain as a minor constituent of the cupreous powder.

During the passage of the product through the impact or crushing mill, it is preferred to proceed according to the method described in my United States Patent No. 2,420,540 so that the unconverted copper particles in the product acquire a protective film of cuprous oxide during passage through the impact mill.

Having thus described the invention, what is claimed is:

1. In a method of making a cupreous powder, the steps comprising reacting slightly less than a stoichiometric amount of finely divided sulphur with an amount of the finely divided brownish red sludge, known in the trade as "cement copper" or "copper precipitate," sufficient to provide a stoichiometric amount of copper, while both are suspended in a slightly acidified aqueous medium forming a product consisting essentially of cuprous sulphide and some unreacted copper, separating the cupreous powder consisting essentially of copper sulphide particles and a minor proportion of metallic copper particles, and then drying and finely grinding the cupreous powder.

2. In a method of making a cupreous powder, the steps comprising reacting less than stoichiometric amounts of finely divided sulphur with an amount of the finely divided brownish red sludge, known in the trade as "cement copper" or "copper precipitate," sufficient to provide a stoichiometric amount of copper, while both are suspended in a slightly acidified aqueous medium to form a product consisting essentially of cuprous sulphide and some unreacted copper, separating the cupreous powder consisting essentially of copper sulphide particles and a minor proportion of metallic copper particles, then drying and finely grinding the cupreous powder under oxidizing atmospheric conditions producing a protective film of cuprous oxide on the metallic copper particles.

3. The method as defined in claim 1 wherein the cupreous powder is dried prior to the grinding operation to a moisture content of less than 10%.

4. As a new article of manufacture, a finely divided air-stable cupreous powder for the purposes specified, consisting essentially of cuprous sulphide and a minor proportion of metallic copper particles distributed throughout the mass of the cuprous sulphide and having protective films of cuprous oxide thereon, said cuprous powder being substantially free from cupric compounds.

5. As a new article of manufacture, a finely divided air-stable cupreous powder for the purposes specified, consisting essentially of about 90% cuprous sulphide and the remainder consisting of metallic copper particles having protective films of cuprous oxide thereon.

6. The cupreous powder defined in claim 4 wherein the majority of the particles thereof are of a size from 10 to 40 microns.

7. The cupreous powder defined in claim 5 wherein majority of the particles thereof are of a size from 10 to 40 microns.

References Cited in the file of this patent

UNITED STATES PATENTS

| Number | Name | Date |
|---|---|---|
| 2,332,145 | Hay | Oct. 19, 1943 |
| 2,450,540 | Hubbell | May 13, 1947 |

OTHER REFERENCES

"A Review of Ship Bottom Paints," C. M. Jackson, The Paint Industry Magazine, Dec. 1942, pp. 412 and 414.